United States Patent
Varshney et al.

(10) Patent No.: US 7,551,902 B2
(45) Date of Patent: Jun. 23, 2009

(54) METHOD AND APPARATUS TO INCREASE THE DIVERSITY ORDER FOR A MULTI-CARRIER FDM SYSTEM

(75) Inventors: Prabodh Varshney, Coppell, TX (US); Adrian Boariu, Irving, TX (US)

(73) Assignee: Nokia Corporation, Espoo (FI)

( * ) Notice: Subject to any disclaimer, the term of this patent is extended or adjusted under 35 U.S.C. 154(b) by 392 days.

(21) Appl. No.: 11/025,647

(22) Filed: Dec. 28, 2004

(65) Prior Publication Data

US 2006/0141949 A1 Jun. 29, 2006

(51) Int. Cl.
- H04B 1/02 (2006.01)
- H04J 11/00 (2006.01)
- H04K 1/02 (2006.01)

(52) U.S. Cl. .................. 455/101; 455/102; 455/103; 370/208; 375/299

(58) Field of Classification Search ............... 455/101, 455/272, 275, 102, 103; 370/208; 375/299
See application file for complete search history.

(56) References Cited

U.S. PATENT DOCUMENTS

| | | | |
|---|---|---|---|
| 6,404,783 B1 | 6/2002 | Cimini, Jr. et al. | 370/525 |
| 6,662,024 B2 * | 12/2003 | Walton et al. | 455/562.1 |
| 6,701,129 B1 * | 3/2004 | Hashem et al. | 455/67.11 |
| 6,850,741 B2 * | 2/2005 | Lei et al. | 455/101 |
| 6,925,131 B2 * | 8/2005 | Balakrishnan et al. | 375/299 |
| 7,002,900 B2 * | 2/2006 | Walton et al. | 370/208 |
| 7,181,167 B2 * | 2/2007 | Onggosanusi et al. | 455/63.1 |
| 2001/0053143 A1 * | 12/2001 | Li et al. | 370/344 |
| 2003/0060173 A1 * | 3/2003 | Lee et al. | 455/103 |
| 2004/0081073 A1 | 4/2004 | Walton et al. | 370/204 |
| 2008/0117999 A1 * | 5/2008 | Kadous et al. | 375/267 |

* cited by examiner

*Primary Examiner*—Duc M Nguyen
(74) *Attorney, Agent, or Firm*—Harrington & Smith, PC

(57) ABSTRACT

A transmitter operates to increase a diversity order of a multi-carrier frequency division multiplex (MC-FDM) system. The transmitter has at least two transmit antennas and circuitry to provide at least two of the MC system frequency sub-carriers to different ones of the at least two transmit antennas.

26 Claims, 2 Drawing Sheets

METHOD AND APPARATUS TO INCREASE THE DIVERSITY ORDER FOR A MULTI-CARRIER FDM SYSTEM

TECHNICAL FIELD

The presently preferred embodiments of this invention relate generally to wireless communication systems and, more specifically, relate to Multi-Carrier (MC) Frequency Division Multiplex (FDM) radio frequency (RF) communications systems such as, but not limited to, a proposed multi-carrier code division multiple access (CDMA) system that is currently known generally as cdma2000 3X EV-DV, also referred to as cdma2000 MC, and variations thereof.

BACKGROUND

Generally, in a FDM system a transmitter transmits data on different RF carrier frequencies. Typically each carrier frequency conveys an independent data stream, and a single carrier serves a particular user. In order to increase the data rate, two or more carriers can be grouped together such that the user is capable of receiving data simultaneously from different carriers. Such a scheme has been proposed for use in, for example, a 3xEV-DV system, where three adjacent 1xEV-DV carriers form the system, while preserving the 1xEV-DV compatibility for each carrier.

As currently specified, the cdma2000 MC system evenly distributes downlink traffic (traffic going from a base station (BS) to a mobile station (MS)) to all of the forward link carriers (to the three specified 1.25 MHz, actually 1.2288 MHz, carriers). As currently specified, the MS may be assigned one carrier or three carriers to receive data, depending on the required Quality of Service (QoS).

Although the 3xEV-DV system has three times the bandwidth of the 1xEV-DV system, it is expected that the diversity order will not increase proportionally. This is because the carrier frequencies are separated by 1.2288 MHz, which is a small amount relative to the coherence bandwidth (delta $f_c$). That is, the 3xEV-DV system may exhibit the characteristics of a frequency non-selective channel, in some situations.

As employed herein, the diversity order is considered to be the number of uncorrelated signal paths that exist between a transmitter and a receiver. As employed herein, the coherence bandwidth delta $f_c$ is considered as the maximum frequency separation of two sinusoids that are affected in a similar way by the channel.

As was noted, when a MC-FDM system uses adjacent carriers, it is possible that the diversity order does not increase because the overall system still has a bandwidth less than the coherence bandwidth. In this case it can be noted that the receiver must track the channel realizations for each carrier, since due to hardware imperfections the bandpass filters for the sub-carriers are typically dissimilar (although the carriers may be correlated).

Considering the specific case of the 3xEV-DV system, the receiver may need to track three channels, one for each of the carriers employed. It can thus be appreciated that it would be desirable to increase the diversity order of a MC-FDM system that operates with frequency non-selective channels, and yet do so without increasing the number of channels realizations the receiver has to track (estimate).

A common solution for this type of problem is to use transmit antenna diversity. However, and if for example two antennas are used at the transmitter, the receiver is required to track and estimate twice as many channels as for the one transmit antenna case.

SUMMARY OF THE PREFERRED EMBODIMENTS

The foregoing and other problems are overcome, and other advantages are realized, in accordance with the presently preferred embodiments of this invention.

In one aspect this invention provides a transmitter to increase a diversity order of a multi-carrier frequency division multiplex (MC-FDM) system, comprising at least two transmit antennas, and circuitry to provide at least two of the MC system frequency sub-carriers to different ones of the at least two transmit antennas.

In another aspect thereof this invention provides a base station transmitter of a MC-FDM system, comprising at least two transmit antennas, and circuitry to provide at least two of the MC system frequency sub-carriers to different ones of the at least two transmit antennas for transmission to a mobile station receiver through a channel. The circuitry provides, to at least one of the at least two transmit antennas, fewer than all of the at least two MC system frequency sub-carriers.

In a still further aspect thereof this invention provides a method to increase the diversity order of a MC-FDM system, comprising (a) providing at least two transmit antennas; and (b) allocating at least two of the MC system frequency sub-carriers to different ones of the at least two transmit antennas.

In another aspect thereof this invention provides a computer readable data storage medium that stores program instructions that direct a data processor to increase a diversity order of a MC-FDM system having at least two transmit antennas, where the instructions cause the data processor and system to perform operations of allocating at least two of the MC system frequency sub-carriers to different ones of the at least two transmit antennas and transmitting the allocated sub-carriers towards a receiver.

In a still further aspect thereof this invention provides apparatus to increase the diversity order of a multi-carrier (MC) system, and comprises at least two transmit antennas and means, coupled to the at least two transmit antennas, for providing at least two MC system frequency sub-carriers to different ones of the at least two transmit antennas.

In one still further aspect thereof this invention provides a multi-carrier (MC) transmitter apparatus having at least two transmit antennas and means, coupled to the at least two transmit antennas, for providing at least two MC system frequency sub-carriers to different ones of the at least two transmit antennas for transmission to a channel. The providing means provides, to at least one of the at least two transmit antennas, fewer than all of the at least two MC system frequency sub-carriers.

BRIEF DESCRIPTION OF THE DRAWINGS

The foregoing and other aspects of the presently preferred embodiments of this invention are made more evident in the following Detailed Description of the Preferred Embodiments, when read in conjunction with the attached Drawing Figures, wherein.

DETAILED DESCRIPTION OF THE PREFERRED EMBODIMENTS

The methods and apparatus in accordance with embodiments of this invention provide a technique to increase the diversity order of a MC-FDM system, while maintaining the same number of channels that are tracked by the receiver. This is achieved by the use of two or more transmit antennas, with at least two of the 3xEV-DV frequency sub-carriers being assigned to different ones of the transmit antennas.

Figure 1:
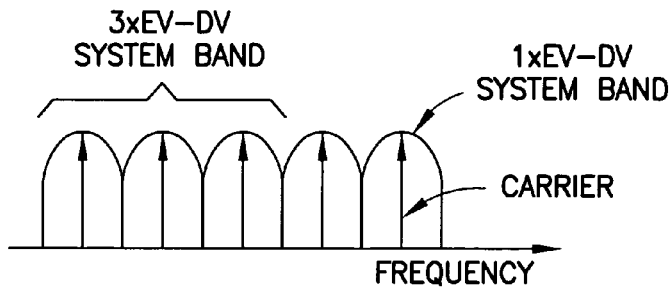
FIG. 1 is a frequency diagram and illustrates an example of three carriers in a 3xEV-DV frequency band and two 1xEV-DV carriers corresponding to two 1xEV-DV frequency bands.

The description of the embodiments of this invention is made in the non-limiting context of the 3xEV-DV system, which is a MC-FDM system. FIG. 1 shows that the 3xEV-DV system is designed to be an extension of the 1xEV-DV system, i.e. it has within the 3xEV-DV system bandwidth (band) three adjacent 1xEV-DV carriers, each of which may be considered as a 3xEV-DV sub-carrier. However, because the 1xEV-DV is a narrow bandwidth system, the adjacent carriers (sub-carriers) of the 3xEV-DV system may be correlated. Therefore the diversity order observed by the 3xEV-DV system is not much greater than the diversity order of the 1xEV-DV system.

Figure 2:
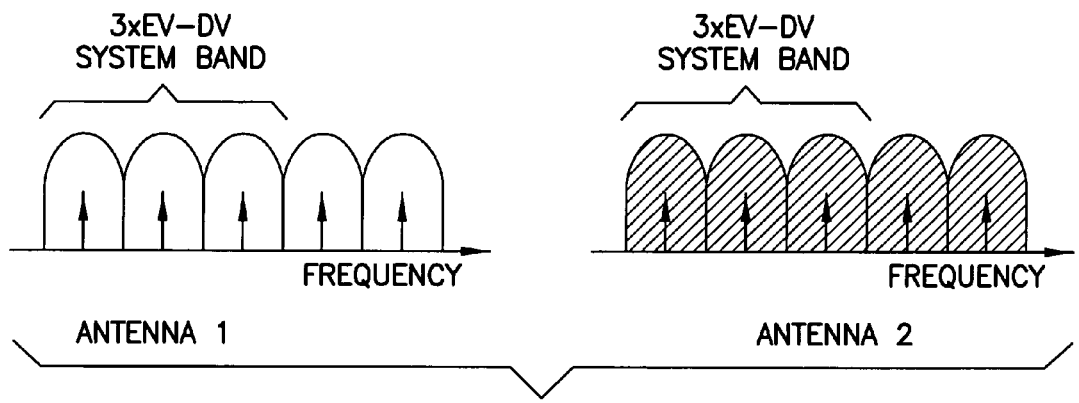
FIG. 2 is a frequency diagram that shows a well-known technique to increase the diversity order by transmitting the same 3xEV-DV and two 1xEV-DV frequency bands from two different transmit antennas.

One (presently non-preferred) solution to increase the diversity order is to use multiple transmit antennas. FIG. 2 shows a technique to double the diversity order by transmitting the same frequency bands over two transmit antennas 1 and 2.

One advantage of the embodiment illustrated in FIG. 2 is that the diversity order doubles for each sub-carrier (1xEV-DV system). However, for the 3xEV-DV system the use of this embodiment becomes costly at the receiver, as six channels must be tracked. Further, it should be appreciated that the bandpass filters for each sub-carrier may need to be different. Note also that the pilot channel powers are one half of the value in the single transmit antenna system of FIG. 1, and therefore the channel estimates made by the receiver are less accurate.

Figure 3:
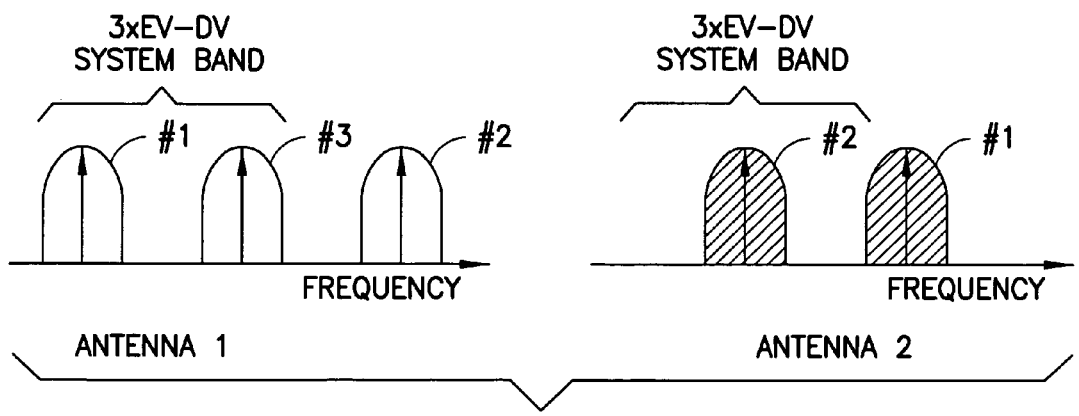
FIG. 3 is a frequency diagram that shows, in accordance with an embodiment of this invention, a technique to increase the diversity order by alternately assigning frequency sub-bands to, for example, two transmit antennas.

FIG. 3 illustrates a presently preferred embodiment of this invention, where the two transmit antennas 1 and 2 are shown by way of example, although more than two transmit antennas can be used. In this embodiment the sub-bands (1xEV-DV system) are alternately assigned to the transmit antennas 1 and 2. As a result, the first and third 3xEV-DV system sub-bands (carriers #1 and #3) are transmitted by antenna 1, while the second 3xEV-DV system sub-band (carrier #2) is transmitted by antenna 2. In this manner the diversity order of the entire 3xEV-DV system increases, as the degree of correlation between spectrally adjacent sub-bands is significantly reduced, although for each sub-band the diversity order is still one.

A significant benefit that is gained by the use of this embodiment of the invention, as compared with the non-preferred embodiment shown in FIG. 2, is that the receiver is still enabled to track three channels, just as in the single transmit antenna system presented in FIG. 1. Thus, diversity order of the system has been increased, without increasing the number of channels that the receiver is required to track.

Figure 4:
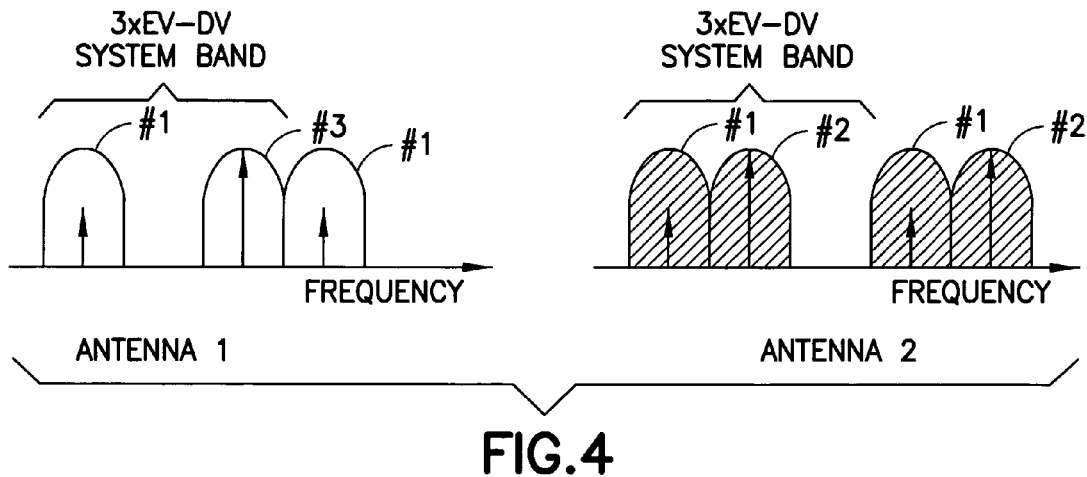
FIG. 4 is a frequency diagram that illustrates a further embodiment of the technique shown in FIG. 3, where the sub-carrier #1 experiences diversity order of two because the signal is transmitted simultaneously from both transmit antennas.

A further embodiment of the invention is shown in FIG. 4, which may be considered to be a variation of the embodiments presented in FIGS. 2 and 3. In this particular example, the sub-carrier #1 of both the systems is transmitted from both antennas 1 and 2, at expense of the receiver tracking four channels, thus increasing the diversity order of the system relative to the embodiment shown in FIG. 3.

Figure 5:
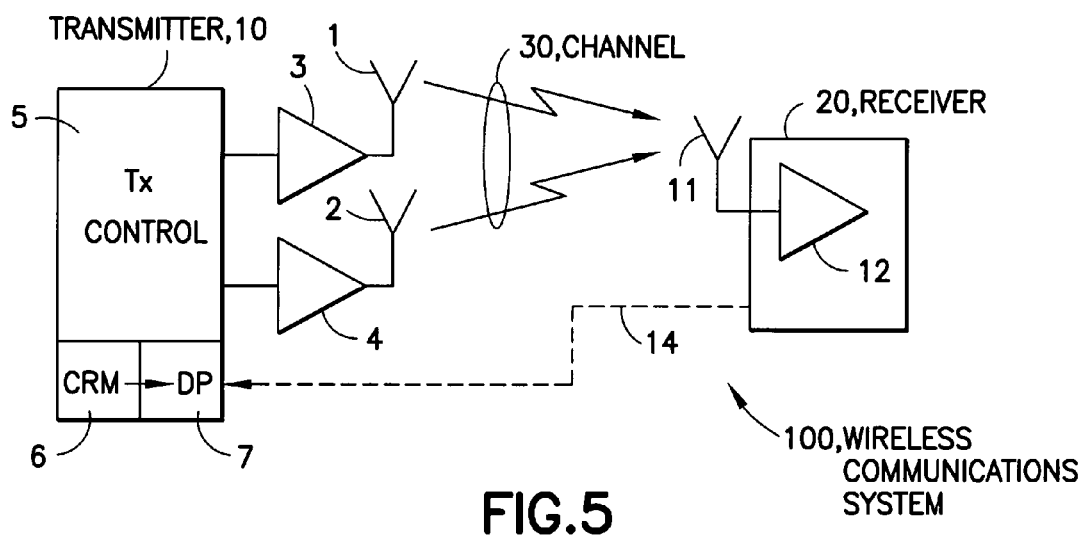
FIG. 5 is a block diagram of a wireless communications system in accordance with the preferred embodiments of this invention, where for simplicity only two transmit antennas are represented.

FIG. 5 is a block diagram of a wireless communications system 100 in accordance with the preferred embodiments of this invention. A transmitter (Tx) 10 includes at least the two antennas 1 and 2 at the outputs of radio frequency (RF) transmitters 3 and 4, respectively. A Tx controller 5 selectively provides the sub-carriers for the 3xEV-DV and 1xEV-DV systems to the RF transmitters 3 and 4 in accordance with one of the embodiments illustrated in FIGS. 3 and 4 for transmission to a receiver (Rx) 20 that has at least a single receive antenna 11 coupled to an input of an RF receiver 12. The typical RF receiver 12 bandpass filters and the like are not shown for simplicity. The channel, which can be frequency selective or frequency non-selective, is designated as 30.

It should be noted that a feedback path 14 may exist between the receiver 20 and the transmitter 10 whereby the transmitter 10 is apprized of channel conditions as seen at the receiver. In this case the Tx controller 5 may adaptively change the allocation of 3xEV-DV and/or 1xEV-DV sub-carriers to the antennas 1 and 2, such as by switching between the embodiment shown in FIG. 3 to the embodiment shown in FIG. 4, and vice versa.

The transmitter 10 may represent a base station (BS) of a cellular communications system, while the receiver 20 may represent a mobile station (MS), such as a cellular telephone. In general, the various embodiments of the receiver 20 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Note that the use of this invention is not restricted for downlink communications from the BS 10 to the MS 20, as in some embodiments it may be desirable to provide the MS 20 with more than one transmit antenna for transmission in accordance with the teachings of this invention to the BS 10.

Note as well that the receiver 20 need not be a mobile receiver, but may also be one that is used at one location, or even one that is fixed in place at one location. The transmitter 10 may be either mobile or fixed in place.

Figure 6:
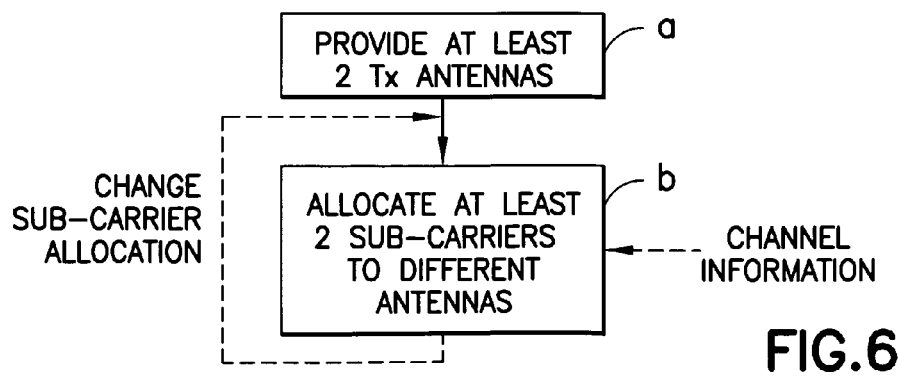
FIG. 6 is a logic flow diagram in accordance with an aspect of this invention.

FIG. 6 is a logic flow diagram in accordance with an aspect of this invention, and shows a method for use by the Tx controller 5 of FIG. 5. The method beneficially increases the diversity order in the MC-FDM system, and includes (a) providing at least two transmit antennas 1 and 2; and (b) allocating at least two of the MC system frequency sub-carriers to different ones of the at least two transmit antennas 1 and 2.

For a case where there are n MC system frequency sub-carriers, where $n \geq 2$, the allocating operation allocates the at least two of the MC system frequency sub-carriers to different ones of the transmit antennas such that there are no spectrally adjacent MC system frequency sub-carriers transmitted by the same antenna. In another case the allocating operation allocates the at least two of the MC system frequency sub-carriers to different ones of the transmit antennas such that there is at least an MC system frequency sub-carrier transmitted by different antennas simultaneously, and each of the other MC system frequency sub-carriers are transmitted by one of the available antennas. For instance, if there are three transmitting antennas TX1, TX2, and TX3, three MC system frequency sub-carriers (e.g., #1, #2, and #3) could be allocated as TX1(#1,0,0), TX2(#1,0,#3), TX3(0,#2,0). In this example, the MC system frequency sub-carrier #1 is transmitted both by antennas TX1 and TX2, and antenna TX2 transmits two MC system frequency sub-carriers #1 and #3 simultaneously, which are not adjacent. Broadly, there is a benefit to providing fewer than all of the MC system frequency sub-carriers to one or more of the transmit antennas. However, more benefit, in terms of tracking expense, can be derived by providing a given MC system frequency sub-carrier to fewer antennas (e.g., providing MC system frequency sub-carrier #1 to one transmit antenna is better than providing MC system frequency sub-carrier #1 to two transmit antennas).

The allocating operation may also allocate a plurality of other sub-carriers, such as the 1xEV-DV sub-carriers, for transmission by different ones of the at least two antennas.

As shown by the dashed lines in FIG. 6, the method can further receive information regarding the channel, such as the feedback information 14, and responsive to the information, can change an allocation of the MC system frequency sub-carriers to different ones of the at least two transmit antennas 1 and 2.

The method shown in FIG. 6 can be implemented by providing computer program instructions in a computer readable medium (CRM 6, shown in FIG. 5) for execution by a data processor (DP 7, shown in FIG. 5) that forms a part of the Tx controller 5.

At least one advantage that is bestowed by the use of the embodiments of this invention is an increase in the diversity order of a MC-FDM system without increasing the number of channels (carrier pilots) that the receiver 20 is required to track.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of different numbers of 3xEV-DV and 1xEV-DV sub-carriers may be attempted by those skilled in the art, which may result in the use of a different selection of 3xEV-DV and 1xEV-DV sub-carriers per antenna in the embodiment of FIG. 4. More than two TX antennas may also be used. However, all such and similar modifications of the teachings of this invention will still fall within the scope of the embodiments of this invention.

Furthermore, some of the features of the preferred embodiments of this invention maybe used to advantage without the corresponding use of other features. As such, the foregoing description should be considered as merely illustrative of the principles, teachings and embodiments of this invention, and not in limitation thereof.

What is claimed is:

1. An apparatus comprising: circuitry configured to provide at least one and fewer than all of a plurality of subcarriers to a first transmit antenna and circuitry configured to provide at least one and fewer than all of the plurality of the subcarriers to a second transmit antenna, where, during a transmission time when both the first and the second transmit antennas transmit data on their respective at least one and fewer than all of the plurality of the subcarriers, at least one of the plurality of the subcarriers provided to the first transmit antenna is not provided to the second transmit antenna and at least one of the plurality of the subcarriers provided to the second transmit antenna is not provided to the first transmit antenna, where said circuitry is configured to receive information regarding a channel, and, based on the received information, is configured to change an allocation of the multi-carrier frequency division multiplex system frequency sub-carriers to different ones of the at least two transmit antennas, wherein the apparatus increases a diversity order of the multi-carrier frequency division multiplex system, wherein each of the plurality of the subcarriers corresponds to a frequency band centered at a frequency different from frequencies at which others of the plurality of subcarriers are centered, wherein one of the first and second transmit antennas is configured to simultaneously transmit data on at least two subcarriers of the plurality of the subcarriers during the transmission time, wherein one of the first and second transmit antennas is configured to transmit data on fewer subcarriers than an other of the first and second transmit antennas during the transmission time.

2. An apparatus as in claim 1, where there are n multi-carrier frequency division multiplex system frequency sub-carriers, where n>2, and where the circuitry is configured to provide the plurality of the multi-carrier frequency division multiplex system frequency sub-carriers to different ones of the at least two transmit antennas such that there are no spectrally adjacent multi-carrier frequency division multiplex system frequency sub-carriers transmitted by the same transmit antenna.

3. An apparatus as in claim 1, where there are n multi-carrier frequency division multiplex system frequency sub-carriers, where n>2, and where the circuitry is configured to provide the plurality of the multi-carrier frequency division multiplex system frequency sub-carriers to different ones of the at least two transmit antennas such that there are at least two spectrally adjacent multi-carrier frequency division multiplex system frequency sub-carriers transmitted by the same transmit antenna, where at least one of the two spectrally adjacent multi-carrier frequency division multiplex system frequency sub-carriers is also transmitted by another transmit antenna.

4. An apparatus as in claim 3, where there are n multi-carrier frequency division multiplex system frequency sub-carriers, where n>2, and where the circuitry is configured to provide a given one of the n multi-carrier frequency division multiplex system frequency sub-carriers to only one of the at least two transmit antennas.

5. An apparatus as in claim 1, where there are n multi-carrier frequency division multiplex system frequency sub-carriers, where n>2, and where the circuitry is configured to provide at least one of the n multi-carrier frequency division multiplex system frequency sub-carriers to multiple ones of the at least two transmit antennas.

6. An apparatus as in claim 1, where there are also a plurality of other sub-carriers provided for transmission by different ones of the at least two transmit antennas, where at least one of the other sub-carriers is transmitted by at least two of the transmit antennas.

7. An apparatus comprising: circuitry configured to provide at least one and fewer than all of a plurality of subcarriers to a first transmit antenna of at least two transmit antennas and circuitry configured to provide at least one and fewer than all of the plurality of the subcarriers to a second transmit antenna of the at least two transmit antennas, where, during a transmission time when both the first and the second transmit antennas transmit data on their respective at least one and fewer than all of the plurality of the subcarriers, at least one of the plurality of the subcarriers provided to the first transmit antenna is not provided to the second transmit antenna and at least one of the plurality of the subcarriers provided to the second transmit antenna is not provided to the first transmit antenna, where said circuitry is configured to receive feedback information from the mobile station regarding the channel, and, based on the received feedback information, is configured to change an allocation of the multi-carrier frequency division multiplex system frequency sub-carriers to different ones of the at least two transmit antennas, wherein each of the plurality of the subcarriers corresponds to a frequency band centered at a frequency different from frequencies at which others of the plurality of subcarriers are centered, wherein one of the first and second transmit antennas is configured to simultaneously transmit data on at least two subcarriers of the plurality of the subcarriers during the transmission time, wherein one of the first and second transmit antennas is configured to transmit data on fewer subcarriers than an other of the first and second transmit antennas during the transmission time.

8. An apparatus as in claim 7, where there are n multi-carrier frequency division multiplex system frequency sub-carriers, where n>2, and where the circuitry is configured to provide the plurality of the multi-carrier frequency division multiplex system frequency sub-carriers to different ones of the transmit antennas such that there are no spectrally adjacent multi-carrier frequency division multiplex system frequency sub-carriers transmitted by the same transmit antenna.

9. An apparatus as in claim 7, where there are n multi-carrier frequency division multiplex system frequency sub-carriers, where n>2, and where the circuitry is configured to provide the plurality of the multi-carrier frequency division multiplex system frequency sub-carriers to different ones of the transmit antennas such that there are at least two spectrally adjacent multi-carrier frequency division multiplex system frequency sub-carriers transmitted by the same transmit antenna, where at least one of the two spectrally adjacent multi-carrier frequency division multiplex system frequency sub-carriers is also transmitted by another transmit antenna.

10. An apparatus as in claim 7, where there are n multi-carrier frequency division multiplex system frequency sub-carriers, where n>2, and where the circuitry is configured to provide at least one of the n multi-carrier frequency division multiplex system frequency sub-carriers to multiple ones of the at least two transmit antennas.

11. An apparatus as in claim 7, where there are n multi-carrier frequency division multiplex system frequency sub-carriers, where n>2, and where the circuitry is configured to provide a given one of the n multi-carrier frequency division multiplex system frequency sub-carriers to only one of the at least two transmit antennas.

12. An apparatus as in claim 7, where there are also a plurality of other sub-carriers provided for transmission by different ones of the at least two transmit antennas, where at least one of the other sub-carriers is transmitted by at least two of the transmit antennas.

13. A method comprising:
allocating to a first transmit antenna of at least two transmit antennas at least one and fewer than all of a plurality of multi-carrier frequency division multiplex system frequency sub-carriers;
allocating to a second transmit antenna of the at least two transmit antennas at least one and fewer than all of the plurality of the multi-carrier frequency division multiplex system frequency sub-carriers, where, during a transmission time when both the first and the second transmit antennas transmit data on their respective at least one and fewer than all of the plurality of the multi-carrier frequency division multiplex system frequency sub-carriers, at least one of the plurality of the multi-carrier frequency division multiplex system frequency sub-carriers provided to the first transmit antenna is not provided to the second transmit antenna and at least one of the plurality of the multi-carrier frequency division multiplex system frequency sub-carriers provided to the second transmit antenna is not provided to the first transmit antenna;
receiving information regarding a channel, and
responsive to the received information, changing an allocation of the plurality of multi-carrier frequency division multiplex system frequency sub-carriers to different ones of the at least two transmit antennas to increase a diversity order of a multi-carrier frequency division multiplex system, wherein each of the plurality of the subcarriers corresponds to a frequency band centered at a frequency different from frequencies at which others of the plurality of subcarriers are centered, wherein one of the first and second transmit antennas is configured to simultaneously transmit data on at least two subcarriers of the plurality of the subcarriers during the transmission time, wherein one of the first and second transmit antennas is configured to transmit data on fewer subcarriers than an other of the first and second transmit antennas during the transmission time.

14. A method as in claim 13, where there are n multi-carrier frequency division multiplex system frequency sub-carriers, where n>2, and where allocating allocates the plurality of the multi-carrier frequency division multiplex system frequency sub-carriers to different ones of the transmit antennas such that there are no spectrally adjacent multi-carrier frequency division multiplex system frequency sub-carriers transmitted by the same transmit antenna.

15. A method as in claim 14, where there are n multi-carrier frequency division multiplex system frequency sub-carriers, where n>2, and where allocating allocates at least one of the n multi-carrier frequency division multiplex system frequency sub-carriers to multiple ones of the at least two transmit antennas.

16. A method as in claim 14, where there are n multi-carrier frequency division multiplex system frequency sub-carriers, where n>2, and where allocating allocates a given one of the n multi-carrier frequency division multiplex system frequency sub-carriers to only one of the at least two transmit antennas.

17. A method as in claim 13, where there are n multi-carrier frequency division multiplex system frequency sub-carriers, where n>2, and where allocating allocates the at least two of the plurality of multi-carrier frequency division multiplex system frequency sub-carriers to different ones of the transmit antennas such that are at least two spectrally adjacent multi-carrier frequency division multiplex system frequency sub-carriers transmitted by the same transmit antenna, and where at least one of the two spectrally adjacent multi-carrier frequency division multiplex system frequency sub-carriers is also allocated for transmission to another transmit antenna.

18. A method as in claim 13, where allocating also allocates a plurality of other sub-carriers for transmission by different ones of the at least two transmit antennas, and where at least one of the other sub-carriers is also allocated to be transmitted by at least two of the transmit antennas.

19. A computer readable data storage medium storing program instructions that direct a data processor to perform operations of:
allocating to a first transmit antenna of at least two transmit antennas at least one and fewer than all of a plurality of multi-carrier frequency division multiplex system frequency sub-carriers;
allocating to a second transmit antenna of the at least two transmit antennas at least one and fewer than all of the plurality of the multi-carrier frequency division multiplex system frequency sub-carriers, where, during a transmission time when both the first and the second transmit antennas transmit data on their respective at least one and fewer than all of the plurality of the multi-carrier frequency division multiplex system frequency sub-carriers, at least one of the plurality of the multi-carrier frequency division multiplex system frequency sub-carriers provided to the first transmit antenna is not provided to the second transmit antenna and at least one of the plurality of the multi-carrier frequency division multiplex system frequency sub-carriers provided to the second transmit antenna is not provided to the first transmit antenna;
transmitting the allocated sub-carriers towards a receiver, receiving information regarding a channel, and
responsive to the received information, changing an allocation of the multi-carrier frequency division multiplex system frequency sub-carriers to different ones of the at least two transmit antennas, wherein each of the plurality of the subcarriers corresponds to a frequency band centered at a frequency different from frequencies at which others of the plurality of subcarriers are centered, wherein one of the first and second transmit antennas is configured to simultaneously transmit data on at least two subcarriers of the plurality of the subcarriers during the transmission time, wherein one of the first and second transmit antennas is configured to transmit data on fewer subcarriers than an other of the first and second transmit antennas during the transmission time.

20. A computer readable storage data medium as in claim 19, where there are n multi-carrier frequency division multiplex system frequency sub-carriers, where n>2, and where allocating allocates the plurality of the multi-carrier frequency division multiplex system frequency sub-carriers to different ones of the transmit antennas such that there are no spectrally adjacent multi-carrier frequency division multiplex system frequency sub-carriers transmitted by the same transmit antenna.

21. A computer readable storage data medium as in claim 20, where there are n multi-carrier frequency division multiplex system frequency sub-carriers, where n>2, and where allocating allocates at least one of the n multi-carrier frequency division multiplex system frequency sub-carriers to multiple ones of the at least two transmit antennas.

22. A computer readable storage data medium as in claim 20, where there are n multi-carrier frequency division multiplex system frequency sub-carriers, where n>2, and where allocating allocates a given one of the n multi-carrier frequency division multiplex system frequency sub-carriers to only one of the at least-two transmit antennas.

23. A computer readable storage data medium as in claim 19, where there are n multi-carrier frequency division multiplex system frequency sub-carriers, where n>2, and where allocating allocates the plurality of the multi-carrier frequency division multiplex system frequency sub-carriers to different ones of the transmit antennas such that are at least two spectrally adjacent multi-carrier frequency division multiplex system frequency sub-carriers transmitted by the same transmit antenna, and where at least one of the two spectrally adjacent multi-carrier frequency division multiplex system frequency sub-carriers is also allocated for transmission to another transmit antenna.

24. A computer readable storage data medium as in claim 19, where allocating also allocates a plurality of other sub-carriers for transmission by different ones of the at least two transmit antennas, and where at least one of the other sub-carriers is also allocated to be transmitted by at least two of the transmit antennas.

25. Apparatus comprising: circuitry configured to provide at least one and fewer than all of a plurality of subcarriers to a first transmit antenna of at least two transmit antennas and circuitry configured to provide at least one and fewer than all of the plurality of the subcarriers to a second transmit antenna of the at least two transmit antennas, where, during a transmission time when both the first and the second transmit antennas transmit data on their respective at least one and fewer than all of the plurality of the subcarriers, at least one of the plurality of the subcarriers provided to the first transmit antenna is not provided to the second transmit antenna and at least one of the plurality of the subcarriers provided to the second transmit antenna is not provided to the first transmit antenna, where said circuitry is configured to receive information regarding a channel, and is configured to change, based on the received information, an allocation of the multi-carrier frequency division multiplex system frequency sub-carriers to different ones of the at least two transmit antennas, wherein each of the plurality of the subcarriers corresponds to a frequency band centered at a frequency different from frequencies at which others of the plurality of subcarriers are centered, wherein one of the first and second transmit antennas is configured to simultaneously transmit data on at least two subcarriers of the plurality of the subcarriers during the transmission time, wherein one of the first and second transmit antennas is configured to transmit data on fewer subcarriers than an other of the first and second transmit antennas during the transmission time.

26. A multi-carrier frequency division multiplex transmitter apparatus, comprising: means configured to provide at least one and fewer than all of a plurality of subcarriers to a first transmit antenna of at least two transmit antennas and means configured to provide at least one and fewer than all of the plurality of the subcarriers to a second transmit antenna of the at least two transmit antennas, where, during a transmission time when both the first and the second transmit antennas transmit data on their respective at least one and fewer than all of the plurality of the subcarriers, at least one of the plurality of the subcarriers provided to the first transmit antenna is not provided to the second transmit antenna and at least one of the plurality of the subcarriers provided to the second transmit antenna is not provided to the first transmit antenna, where said circuitry is configured to receive information regarding a channel, and, based on the received information, is configured to change an allocation of the multi-carrier frequency division multiplex system frequency sub-carriers to different ones of the at least two transmit antennas, wherein each of the plurality of the subcarriers corresponds to a frequency band centered at a frequency different from frequencies at which others of the plurality of subcarriers are centered, wherein one of the first and second transmit antennas is configured to simultaneously transmit data on at least two subcarriers of the plurality of the subcarriers during the transmission time, wherein one of the first and second transmit antennas is configured to transmit data on fewer subcarriers than an other of the first and second transmit antennas during the transmission time.

* * * * *